(12) United States Patent
Rhoney et al.

(10) Patent No.: US 9,057,863 B2
(45) Date of Patent: Jun. 16, 2015

(54) POLARITY SCHEME FOR PARALLEL-OPTICS DATA TRANSMISSION

(75) Inventors: Brian Keith Rhoney, Hickory, NC (US); Wesley Allan Yates, Lenoir, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 13/557,671

(22) Filed: Jul. 25, 2012

(65) Prior Publication Data

US 2014/0029909 A1    Jan. 30, 2014

(51) Int. Cl.
*G02B 6/44* (2006.01)

(52) U.S. Cl.
CPC ................................ *G02B 6/4472* (2013.01)

(58) Field of Classification Search
None
See application file for complete search history.

(56) References Cited

U.S. PATENT DOCUMENTS

| | | |
|---|---|---|
| 4,611,887 A | 9/1986 | Glover et al. |
| 4,699,460 A | 10/1987 | Szentesi |
| 5,204,925 A * | 4/1993 | Bonanni et al. ............... 385/89 |
| 5,613,070 A | 3/1997 | Born |
| 6,185,358 B1 | 2/2001 | Park |
| 6,219,479 B1 | 4/2001 | Madden et al. |
| 6,224,269 B1 | 5/2001 | Engstrand et al. |
| 6,275,643 B1 | 8/2001 | Bandy et al. |
| 6,351,582 B1 | 2/2002 | Dyke et al. |
| 6,364,539 B1 | 4/2002 | Shahid |
| 6,402,393 B1 | 6/2002 | Grimes et al. |
| 6,464,404 B1 | 10/2002 | Robinson et al. |
| 6,496,641 B1 | 12/2002 | Mahony |
| 6,501,900 B1 | 12/2002 | Aloisio, Jr. et al. |
| 6,554,483 B1 | 4/2003 | Sun et al. |
| 6,621,975 B2 | 9/2003 | Laporte et al. |
| 6,694,083 B2 | 2/2004 | Paradiso et al. |
| 6,758,600 B2 | 7/2004 | Del Grosso et al. |
| 6,869,227 B2 | 3/2005 | Del Grosso et al. |
| 7,088,981 B2 | 8/2006 | Chang |
| 7,147,383 B2 | 12/2006 | Sullivan |
| 7,237,966 B2 | 7/2007 | Quinby et al. |
| 7,354,202 B1 | 4/2008 | Luger |
| 7,391,952 B1 | 6/2008 | Ugolini et al. |

(Continued)

FOREIGN PATENT DOCUMENTS

| | | | |
|---|---|---|---|
| CN | 102073109 A | 5/2011 | |
| EP | 1065544 A2 | 1/2001 | ............... G02B 6/44 |

(Continued)

OTHER PUBLICATIONS

International preliminary report on patentability for PCT/US2013/051424, dated Jan. 27, 2015.*

(Continued)

*Primary Examiner* — Mike Stahl
(74) *Attorney, Agent, or Firm* — Brad Christopher Rametta

(57) ABSTRACT

A fiber optic harness assembly includes first through sixth groups of optical fibers and first and second connector sets. The groups of optical fibers are arranged in data transmission pairs such that one group of each pair is configured to transmit data and the other group is configured to receive data. The pairs of the groups are organized such that a first pair includes the first and second groups, a second pair includes the third and fourth groups, and a third pair includes the fifth and sixth groups. The optical fibers of the groups are sized and routed to facilitate low-skew and efficient parallel optics connections for high-speed data transmission.

20 Claims, 5 Drawing Sheets

(56) References Cited

U.S. PATENT DOCUMENTS

| | | | |
|---|---|---|---|
| 7,542,653 B2 | 6/2009 | Johnson et al. | |
| 7,603,044 B1 | 10/2009 | Conroy et al. | |
| 7,646,981 B2 | 1/2010 | Coffey | |
| 7,689,079 B2 | 3/2010 | Burnham et al. | 385/51 |
| 7,756,371 B1 | 7/2010 | Burnham et al. | 385/51 |
| 8,009,959 B2 | 8/2011 | Barnes et al. | |
| 8,251,591 B2 | 8/2012 | Barnes et al. | |
| 8,821,036 B2 | 9/2014 | Shigehara | |
| 2002/0015563 A1 | 2/2002 | Murakami et al. | |
| 2002/0181925 A1 | 12/2002 | Hodge et al. | |
| 2003/0044141 A1* | 3/2003 | Melton et al. | 385/114 |
| 2003/0072537 A1 | 4/2003 | Eichenberger et al. | |
| 2003/0210861 A1 | 11/2003 | Weiss et al. | |
| 2004/0062498 A1 | 4/2004 | Del Grosso et al. | |
| 2004/0179771 A1 | 9/2004 | Verhagen et al. | |
| 2004/0184741 A1 | 9/2004 | Del Grosso et al. | |
| 2005/0036749 A1 | 2/2005 | Vogel et al. | |
| 2005/0152640 A1 | 7/2005 | Lemoff | |
| 2005/0163448 A1 | 7/2005 | Blackwell et al. | |
| 2005/0207709 A1 | 9/2005 | Del Grosso et al. | |
| 2006/0029334 A1 | 2/2006 | Quinby et al. | 385/59 |
| 2006/0034573 A1 | 2/2006 | Guan et al. | |
| 2006/0045521 A1 | 3/2006 | Emery et al. | |
| 2006/0133736 A1 | 6/2006 | Sullivan | |
| 2006/0269208 A1 | 11/2006 | Allen | |
| 2006/0280420 A1 | 12/2006 | Blackwell et al. | |
| 2007/0071392 A1 | 3/2007 | Baucom et al. | |
| 2007/0189694 A1 | 8/2007 | Mullaney et al. | |
| 2008/0152292 A1 | 6/2008 | Wilken et al. | |
| 2008/0175548 A1 | 7/2008 | Knecht et al. | |
| 2008/0193091 A1 | 8/2008 | Herbst | |
| 2008/0205824 A1 | 8/2008 | Cody et al. | |
| 2008/0279506 A1* | 11/2008 | Kerry et al. | 385/59 |
| 2009/0103879 A1 | 4/2009 | Tang et al. | |
| 2009/0154888 A1 | 6/2009 | Abbott, III et al. | |
| 2009/0169163 A1 | 7/2009 | Abbott, III et al. | |
| 2009/0180737 A1 | 7/2009 | Burnham et al. | 385/59 |
| 2009/0263089 A1 | 10/2009 | Keller et al. | 385/109 |
| 2009/0290844 A1 | 11/2009 | Mullaney et al. | |
| 2010/0092129 A1 | 4/2010 | Conner | |
| 2010/0092133 A1 | 4/2010 | Conner | |
| 2010/0092146 A1 | 4/2010 | Conner et al. | |
| 2010/0092169 A1 | 4/2010 | Conner et al. | |
| 2010/0092171 A1 | 4/2010 | Conner | |
| 2010/0098386 A1* | 4/2010 | Kleeberger | 385/100 |
| 2010/0195955 A1 | 8/2010 | Burnham et al. | |
| 2010/0303408 A1 | 12/2010 | Conner et al. | |
| 2010/0322554 A1 | 12/2010 | Barnes et al. | 385/24 |
| 2011/0103803 A1 | 5/2011 | Kolesar | |
| 2011/0129226 A1 | 6/2011 | Vleugels et al. | |
| 2011/0274400 A1 | 11/2011 | Mudd et al. | 385/134 |
| 2011/0293277 A1 | 12/2011 | Bradea et al. | |
| 2012/0189259 A1* | 7/2012 | Manes | 385/135 |
| 2012/0288233 A1 | 11/2012 | Barnes et al. | |
| 2013/0163932 A1* | 6/2013 | Cooke et al. | 385/76 |
| 2014/0140660 A1* | 5/2014 | Buff et al. | 385/59 |
| 2014/0254986 A1 | 9/2014 | Kmit et al. | |

FOREIGN PATENT DOCUMENTS

| | | | |
|---|---|---|---|
| WO | 0244782 | A2 | 6/2002 |
| WO | 03016975 | A2 | 2/2003 |
| WO | 2005114286 | A1 | 12/2005 |
| WO | 2010044979 | A1 | 4/2010 |
| WO | 2010093794 | A1 | 8/2010 |
| WO | 2011053409 | A1 | 5/2011 |

OTHER PUBLICATIONS

Patent Cooperation Treaty, International Search Report for PCT/US2013/051424, Oct. 21, 2013, 4 pages.

Author Unknown, "QSFP (Quad Small Formfactor Pluggable) Transceiver," INF-8438i Specification, SFF Committee, Rev 1.0, Nov. 2006, 75 pages.

Final Office Action for U.S. Appl. No. 12/323,395, mailed Oct. 9, 2014, 10 pages.

Non-final Office Action for U.S. Appl. No. 13/649,392 mailed Oct. 2, 2014, 13 pages.

Non-final Office Action for U.S. Appl. No. 13/751,232 mailed Sep. 17, 2014, 8 pages.

International Search Report for PCT/US2013/069548 mailed Feb. 6, 2014, 4 pages.

Non-final Office Action for U.S. Appl. No. 12/288,231 mailed May 25, 2011, 10 pages.

Final Office Action for U.S. Appl. No. 12/288,231 mailed Nov. 14, 2011, 6 pages.

Advisory Action for U.S. Appl. No. 12/288,231 mailed Apr. 5, 2012, 3 pages.

Non-final Office Action for U.S. Appl. No. 12/323,356 mailed Sep. 30, 2011, 15 pages.

Final Office Action for U.S. Appl. No. 12/323,356 mailed Mar. 2, 2012, 18 pages.

Non-final Office Action for U.S. Appl. No. 12/323,385 mailed Sep. 21, 2011, 10 pages.

Final Office Action for U.S. Appl. No. 12/323,385 mailed Mar. 6, 2012, 12 pages.

Advisory Action for U.S. Appl. No. 12/323,385 mailed Jun. 15, 2012, 2 pages.

Non-final Office Action for U.S. Appl. No. 10/805,892 mailed Aug. 10, 2004, 4 pages.

Notice of Allowance for U.S. Appl. No. 10/805,892 mailed Dec. 21, 2004, 5 pages.

Non-final Office Action for U.S. Appl. No. 11/020,730 mailed Feb. 28, 2006, 6 pages.

Notice of Allowance for U.S. Appl. No. 11/020,730 mailed Sep. 20, 2006, 7 pages.

Non-final Office Action for U.S. Appl. No. 12/486,427 mailed Mar. 5, 2010, 5 pages.

Notice of Allowance for U.S. Appl. No. 12/486,427 mailed Aug. 27, 2010, 6 pages.

Notice of Allowance for U.S. Appl. No. 12/486,427 mailed Jun. 13, 2011, 7 pages.

Non-final Office Action for U.S. Appl. No. 12/486,427 mailed Oct. 21, 2010, 5 pages.

Notice of Allowance for U.S. Appl. No. 12/486,473 mailed May 29, 2012, 9 pages.

Non-final Office Action for U.S. Appl. No. 12/486,473 mailed Sep. 29, 2011, 4 pages.

Non-final Office Action for U.S. Appl. No. 12/323,344 mailed Aug. 18, 2011, 8 pages.

Notice of Allowance for U.S. Appl. No. 12/323,344 mailed Jan. 9, 2012, 9 pages.

Non-final Office Action for U.S. Appl. No. 12/323,395 mailed Dec. 8, 2011, 7 pages.

International Search Report for PCT/US2009/056880 mailed Nov. 9, 2009, 3 pages.

International Search Report for PCT/US2009/057128 mailed Nov. 9, 2009, 2 pages.

International Search Report for PCT/US2009/057140 mailed Nov. 9, 2009, 3 pages.

International Search Report for PCT/US2009/057244 mailed Nov. 9, 2009, 4 pages.

International Preliminary Report on Patentability for PCT/US2009/057244 mailed Apr. 19, 2011, 7 pages.

Tanji et al., "Optical Fiber Cabling Technologies for Flexible Access Network," Optical Fiber Technology, Academic Press, London, US, vol. 14, No. 3, Jul. 1, 2008, 8 pages.

Author Unknown, "High Density PARA-OPTIX Cable Assemblies and Enclosures," Tyco Electronics, 2007, 2 pages.

Non-final Office Action for U.S. Appl. No. 12/288,231 mailed Feb. 13, 2014, 7 pages.

Notice of Allowance for U.S. Appl. No. 12/323,356 mailed Jan. 17, 2014, 7 pages.

Non-final Office Action for U.S. Appl. No. 12/472,849 mailed Oct. 12, 2011, 9 pages.

Non-final Office Action for U.S. Appl. No. 12/472,849 mailed Aug. 20, 2012, 9 pages.

(56) References Cited

OTHER PUBLICATIONS

Final Office Action for U.S. Appl. No. 12/472,849 mailed May 13, 2013, 15 pages.
Advisory Action and Examiner-Initiated Interview Summary for U.S. Appl. No. 12/472,849 mailed Aug. 5, 2013, 5 pages.
Non-final Office Action for U.S. Appl. No. 12/472,849 mailed Oct. 9, 2013, 14 pages.
Non-final Office Action for U.S. Appl. No. 12/472,849 mailed May 23, 2014, 13 pages.
Non-final Office Action for U.S. Appl. No. 12/323,395 mailed Apr. 17, 2014, 15 pages.
Non-final Office Action for U.S. Appl. No. 13/559,070 mailed Sep. 27, 2012, 7 pages.
Non-final Office Action for U.S. Appl. No. 13/559,070 mailed Apr. 3, 2014, 8 pages.
Final Office Action for U.S. Appl. No. 13/559,070 mailed Oct. 1, 2013, 8 pages.
International Search Report for PCT/US2010/035939 mailed Aug. 16, 2010, 2 pages.
Kolesar et al., "Clause 86 MDI Optical Pin Layout and Connector," IEEE P802.3ba, Jan. 2009, 24 pages.
Author Unknown, "TIA Standard: Optical Fiber Cabling Components Standard," TIA-568-C.3, Telecommunications Industry Association, Jun. 2008, 38 pages.
Author Unknown, "Parallel Optics," Applications Engineering Note 123, Rev 0, Corning Cable Systems LLC, Mar. 23, 2008, 4 pages.
Author Unknown, "Fiber Systems: Best Practices for Ensuring Polarity of Array-Based Fiber Optic Channels," White Paper, Panduit Corp., 2008, 10 pages.
Stewart, "Optical Assembly Plant: Base 8 Ribbon Module Jumper "Classic"," Flyer 0000009429-EN, Corning Cable Systems, Jan. 23, 2008, 1 page.
Author Unknown, "Data Center Fabric: Corning Cable Systems Optical Cabling Solutions for Brocade," Technical Brief, GA-TB-052-01, Brocade Communications Systems, Inc., Sep. 2008, 26 pages.
Author Unknown, "U-Space System for Brocade 48000," Product Specifications, LAN-904-EN, Corning Cable Systems LLC, Apr. 2008, 16 pages.
Author Unknown, "U-Space System For Brocade SAN Directors," Specification Sheet, LAN-904-EN, Corning Cable Systems LLC, Oct. 2010, 8 pages.
Author Unknown, "Base 8 Modules," Standard Recommended Procedure 003-121, Issue 1, Corning Cable Systems LLC, Apr. 2008, 3 pages.
Final Office Action for U.S. Appl. No. 12/472,849 mailed Dec. 31, 2014, 14 pages.
Non-Final Office Action for U.S. Appl. No. 14/448,252 mailed Dec. 4, 2014, 12 pages.
Notice of Allowance for U.S. Appl. No. 12/323,395 mailed Jan. 7, 2015, 6 pages.
Final Office Action for U.S. Appl. No. 13/559,070 mailed Jan. 13, 2015, 8 pages.
Final Office Action for U.S. Appl. No. 13/751,232 mailed Jan. 23, 2015, 11 pages.

\* cited by examiner

POLARITY SCHEME FOR PARALLEL-OPTICS DATA TRANSMISSION

BACKGROUND

Aspects of the present disclosure relate generally to parallel-optics data transmission and schemes for connecting optical fibers through which the data is provided and received.

Harness assemblies, including harness cables and modules, may be used to arrange optical fibers according to various schemes or mappings to facilitate data transmission via parallel optics. Because a single signal may be broken down and parsed into separate optical fibers for communication in parallel with one another, accuracy in the routing of the optical fibers and transmission of the signal components allows for faster communications. Current polarity schemes in harness assemblies may be prone to errors in routing due to complicated interweaving of optical fibers and uncoordinated sizing of individual fibers in groups of optical fibers that are intended to operate together to carry the parsed signal. A need exists for an improved scheme for connecting optical fibers for parallel-optics data transmission to overcome such problems in the art.

SUMMARY

One embodiment relates to a fiber optic harness assembly includes first, second, third, fourth, fifth, and sixth groups of optical fibers, a first connector set, and a second connector set. The groups of optical fibers are arranged in data transmission pairs of the groups such that one group of each pair is configured to transmit data and the other group of the pair is configured to receive data. The pairs of the groups are organized such that a first pair includes the first and second groups of optical fibers, a second pair includes the third and fourth groups of optical fibers, and a third pair includes the fifth and sixth groups of optical fibers. The first connector set includes first, second, and third connectors, and the second connector set includes fourth and fifth connectors. The first pair of groups of optical fibers extends between the first and fourth connectors such that the optical fibers of the first and second groups of optical fibers are the same length as one another. The third pair of groups of optical fibers extends between the third and fifth connectors such that the optical fibers of the fifth and sixth groups of optical fibers are the same length as one another. The third group of optical fibers extends between the second and fourth connectors and the fourth group of optical fibers extends between the second and fifth connectors.

Another embodiment relates to a fiber optic harness assembly, which includes first, second, third, fourth, fifth, and sixth groups of optical fibers, a first connector set, and a second connector set. The groups of optical fibers are arranged in data transmission pairs of the groups such that one group of each pair is configured to transmit data and the other group of the pair is configured to receive data. The pairs of the groups are organized such that a first pair includes the first and second groups of optical fibers, a second pair includes the third and fourth groups of optical fibers, and a third pair includes the fifth and sixth groups of optical fibers. The first connector set includes first, second, and third connectors, and the second connector set includes fourth and fifth connectors. The first pair of groups of optical fibers only extends between the first and fourth connectors, and the third pair of groups of optical fibers only extends between the third and fifth connectors. The third group of optical fibers extends between the second and fourth connectors and the fourth group of optical fibers extends between the second and fifth connectors. The groups of optical fibers only cross one another at two locations between the first and second sets of connectors.

Yet another embodiment relates to a fiber optic harness assembly, which includes first, second, third, fourth, fifth, and sixth groups of optical fibers, first and connector sets, a furcation between the first and second sets of connectors, and tubes. The groups of optical fibers are arranged in data transmission pairs of the groups. One group of each pair is configured to transmit data and the other group of the pair is configured to receive data. The pairs of the groups are organized such that a first pair includes the first and second groups of optical fibers, a second pair includes the third and fourth groups of optical fibers, and a third pair includes the fifth and sixth groups of optical fibers. The first connector set includes first, second, and third connectors, and the second connector set includes fourth and fifth connectors. The first pair of groups of optical fibers extends between the first and fourth connectors, and the third pair of groups of optical fibers extends between the third and fifth connectors. The third group of optical fibers extends between the second and fourth connectors and the fourth group of optical fibers extends between the second and fifth connectors. The furcation is optically-located between the first and second sets of connectors and each of the groups of optical fibers passes through the furcation. The tubes include a separate tube between the furcation and each of the connectors, and each pair of groups of optical fibers passes through two of the tubes. The tubes are maneuverable and at least 0.3 m in length, whereby any two of the connectors may be positioned relative to one another anywhere in a distance range between adjoining one another to at least 0.5 m apart from one another.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE FIGURES

The accompanying Figures are included to provide a further understanding, and are incorporated in and constitute a part of this specification. The drawings illustrate one or more embodiments, and together with the Detailed Description serve to explain principles and operations of the various embodiments. As such, the disclosure will become more fully understood from the following Detailed Description, taken in conjunction with the accompanying Figures, in which.

DETAILED DESCRIPTION

Before turning to the following Detailed Description and Figures, which illustrate exemplary embodiments in detail, it should be understood that the present invention is not limited to the details or methodology set forth in the Detailed Description or illustrated in the Figures. For example, as will be understood by those of ordinary skill in the art, features and attributes associated with embodiments shown in one of the Figures or described in the text relating to one of the embodiments may well be applied to other embodiments shown in another of the Figures or described elsewhere in the text.

Figure 1:
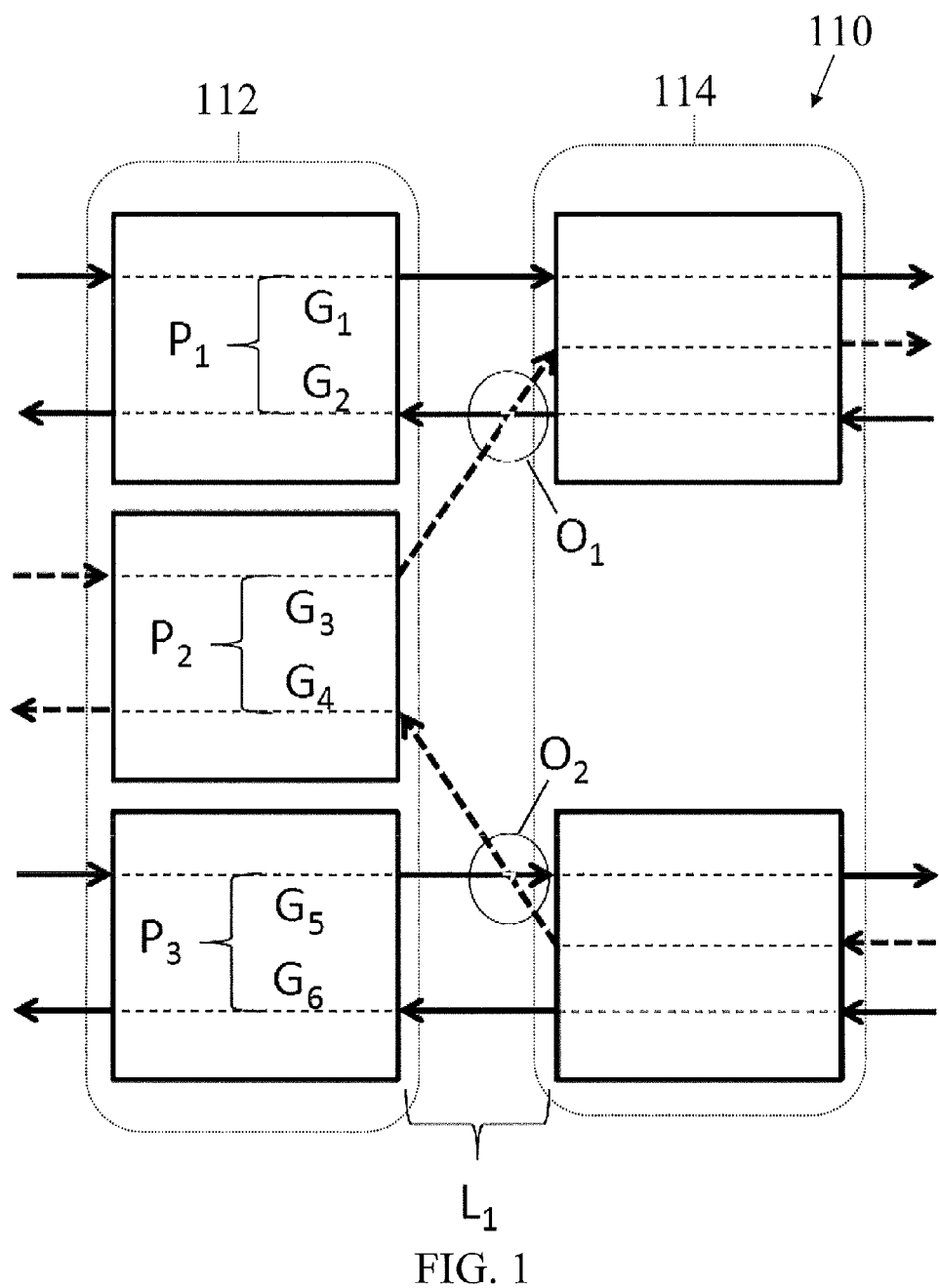
FIG. 1 is a connection scheme for a fiber optic harness assembly according to an exemplary embodiment.
Figure 2:
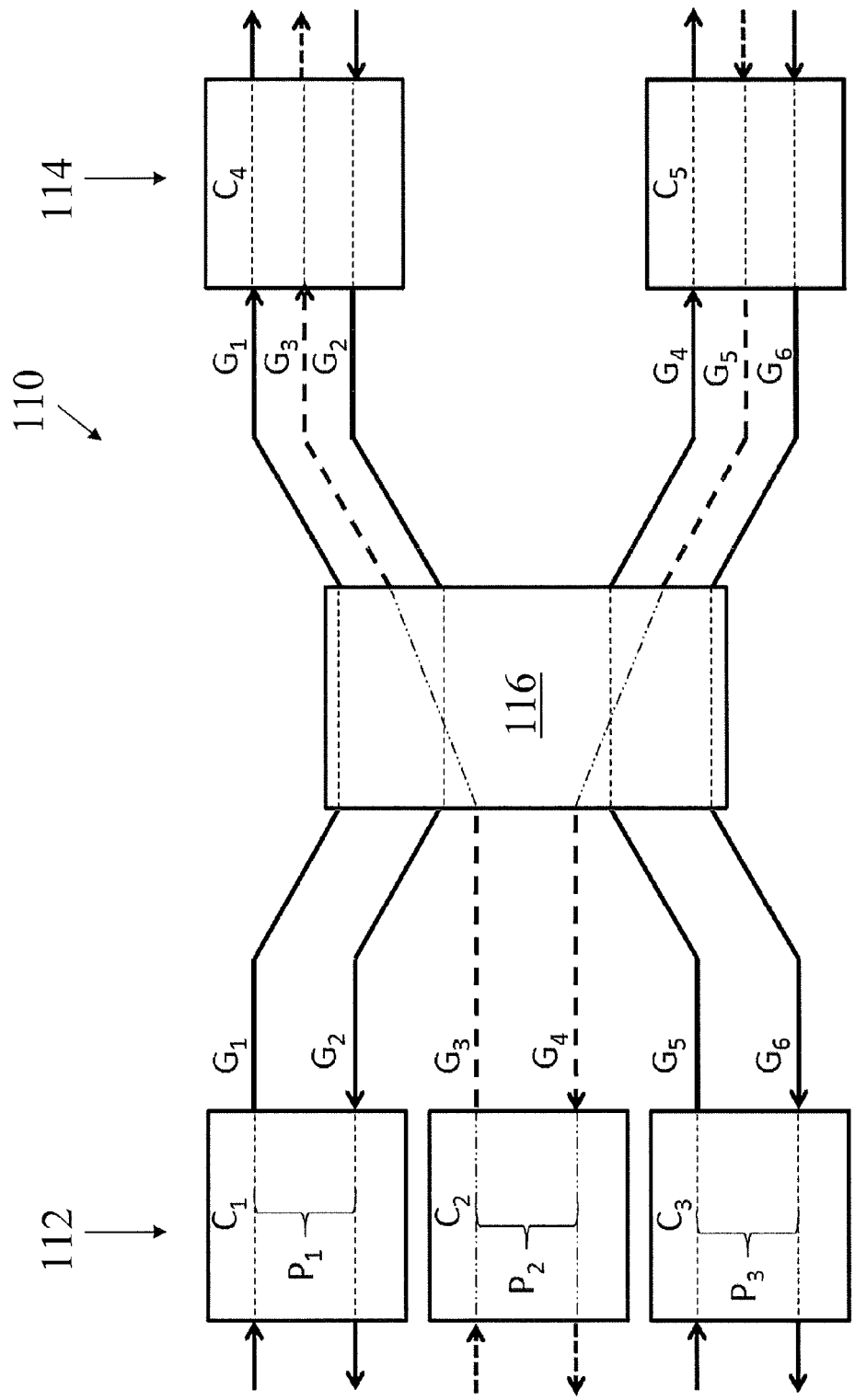
FIG. 2 is the connection scheme of FIG. 1 including a furcation.

Referring to FIGS. 1-2, a fiber optic harness assembly 110 includes first, second, third, fourth, fifth, and sixth groups of optical fibers $G_1$, $G_2$, $G_3$, $G_4$, $G_5$, $G_6$, a first connector set 112, and a second connector set 114. The groups of optical fibers $G_1$, $G_2$, $G_3$, $G_4$, $G_5$, $G_6$ are arranged in data transmission pairs of the groups such that one group of each pair is configured to transmit data and the other group of the pair is configured to receive data (symbolized in FIGS. 1-2 by arrows according to an embodiment). The groups of each pair may be configured to both transmit and/or receive data. According to an exemplary embodiment, the pairs of the groups are organized such that a first pair $P_1$ includes the first and second groups $G_1$, $G_2$ of optical fibers, a second pair $P_2$ includes the third and fourth groups $G_3$, $G_4$ of optical fibers, and a third pair $P_3$ includes the fifth and sixth groups $G_5$, $G_6$ of optical fibers.

According to an exemplary embodiment, the first connector set 112 includes first, second, and third connectors $C_1$, $C_2$, $C_3$ (see FIG. 2; e.g., interfaces, adapters, multi-fiber connectors), and the second connector set 114 includes fourth and fifth connectors $C_4$, $C_5$. In some embodiments, the optical fibers of each group $G_1$, $G_2$, $G_3$, $G_4$, $G_5$, $G_6$ are the same length as the other optical fibers of the respective group $G_1$, $G_2$, $G_3$, $G_4$, $G_5$, $G_6$ (e.g., less than 1% difference in length relative to the longest fiber). Configuring the optical fibers of a particular group to be the same length as one another is intended to reduce skew in data transmission via parallel-optics processes (see Background).

According to an exemplary embodiment, the first pair $P_1$ of groups of optical fibers extends between the first and fourth connectors $C_1$, $C_4$ such that the optical fibers of the first and second groups $G_1$, $G_2$ of optical fibers are the same length as one another (e.g., less than 1% difference in average length of the groups' fibers relative to the longer group's average length). The third pair $P_3$ of groups of optical fibers extends between the third and fifth connectors $C_3$, $C_5$ such that the optical fibers of the fifth and sixth groups $G_5$, $G_6$ of optical fibers are the same length as one another. In some embodiments, the optical fibers of the groups $G_1$, $G_2$, $G_5$, $G_6$ of optical fibers of the first and third pairs $P_1$, $P_3$ are all the same length as one another, but need not always be so.

Figure 5:
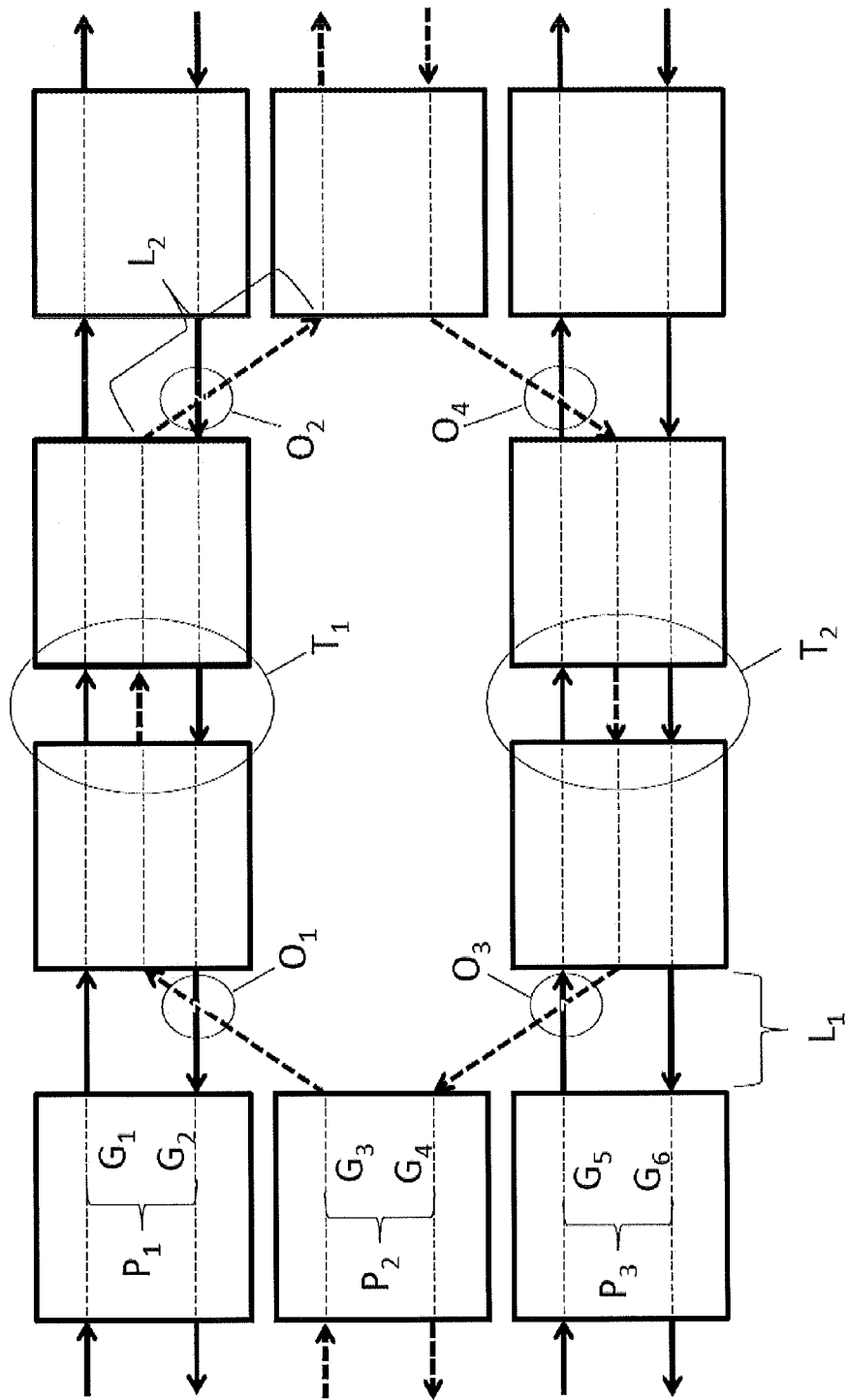
FIG. 5 is a polarity scheme, as may be used with quad small form-factor pluggable (QSFP) modules for parallel-optics data transmission, according to an example embodiment.

According to an exemplary embodiment, the third group $G_3$ of optical fibers extends between the second and fourth connectors $C_2$, $C_4$ and the fourth group $G_4$ of optical fibers extends between the second and fifth connectors $C_2$, $C_5$, where the optical fibers of the third and fourth groups $G_3$, $G_4$ of optical fibers are the same length as one another. In some embodiments, the optical fibers of the third and fourth groups $G_3$, $G_4$ of optical fibers are a different length (e.g., at least 1% difference in average length of the groups' fibers relative to the longer group's average length) than the optical fibers of the groups $G_1$, $G_2$, $G_5$, $G_6$ of optical fibers of the first and third pairs $P_1$, $P_3$ (see, e.g., $L_1$ as shown in FIG. 1 and compare to $L_2$ as shown in FIG. 5).

According to an exemplary embodiment, the first pair $P_1$ of groups of optical fibers only extends between the first and fourth connectors $C_1$, $C_4$, and the third pair $P_3$ of groups of optical fibers only extends between the third and fifth connectors $C_3$, $C_5$. Such an arrangement facilitates a direct route of communication between the respective connectors, thereby reducing the path length of optical fibers (and associated attenuation) and reducing the complexity of the scheme relative to more elaborate arrangements. In some embodiments, the optical fibers of the third group $G_3$ only extend between the second and fourth connectors $C_2$, $C_4$, and the optical fibers of the fourth group $G_4$ only extend between the second and fifth connectors $C_2$, $C_5$.

According to an exemplary embodiment, the groups $G_1$, $G_2$, $G_3$, $G_4$, $G_5$, $G_6$ of optical fibers only cross one another (e.g., over-pass) at two locations as shown in mappings of optical pathways between the first and second sets of connectors 112, 114. As shown in FIGS. 1-2 the corresponding crossings consist of a first crossing $O_1$ between the second and third groups $G_2$, $G_3$ and a second crossing $O_2$ between the fourth and fifth groups $G_4$, $G_5$ (see also crossings $O_3$ and $O_4$ as shown in FIG. 5). Such a scheme is intended to reduce the likelihood of manufacturing error due to incorrect interconnections. Other more-complicated arrangements are contemplated.

According to an exemplary embodiment, the first, second, third, fourth, fifth, and sixth groups of optical fibers $G_1$, $G_2$, $G_3$, $G_4$, $G_5$, $G_6$, each include at least two optical fibers per group, such as at least four, at least six, at least eight, at least twelve, at least twenty-four, at least one-hundred-and-forty-four, or more. In some embodiments, the first, second, third, fourth, fifth, and sixth groups of optical fibers $G_1$, $G_2$, $G_3$, $G_4$, $G_5$, $G_6$ each include the same number of optical fibers as one another, such as two per group, such as at least four, at least six, at least eight, at least twelve, at least twenty-four, at least one-hundred-and-forty-four per group, or more. The number of fibers in groups of the same pair may be the same. The number of fibers in groups of optical fibers in all of the groups $G_1$, $G_2$, $G_3$, $G_4$, $G_5$, $G_6$ may be the same, or may differ, such as four fibers in each of groups $G_1$, $G_2$, $G_5$, $G_6$ and eight fibers in each of groups $G_3$, $G_4$. The fibers of a group, of a pair, and/or of the harness assembly may operate in conjunction with one another to provide a finely parsed signal(s) and a correspondingly higher rate of data transmission, when compared to schemes using a fewer number of fibers per group (such as only one single mode fiber). In various alternate embodiments, the optical fibers of the groups may be arranged in different configurations, such as loose optical fibers (single mode or multi-mode), ribbons of optical fibers joined together, or even one or more "multi-core" fibers that include multiple optical fibers bound in a single cladding.

Figure 3:
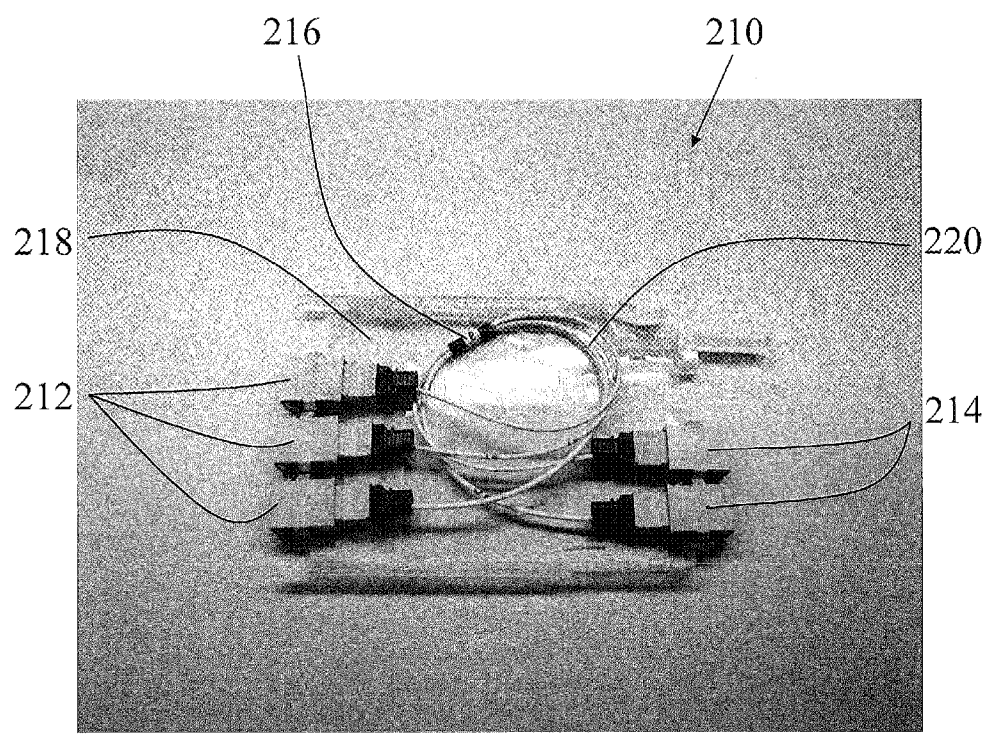
FIG. 3 is a digital image of a harness module according to an exemplary embodiment.
Figure 4:
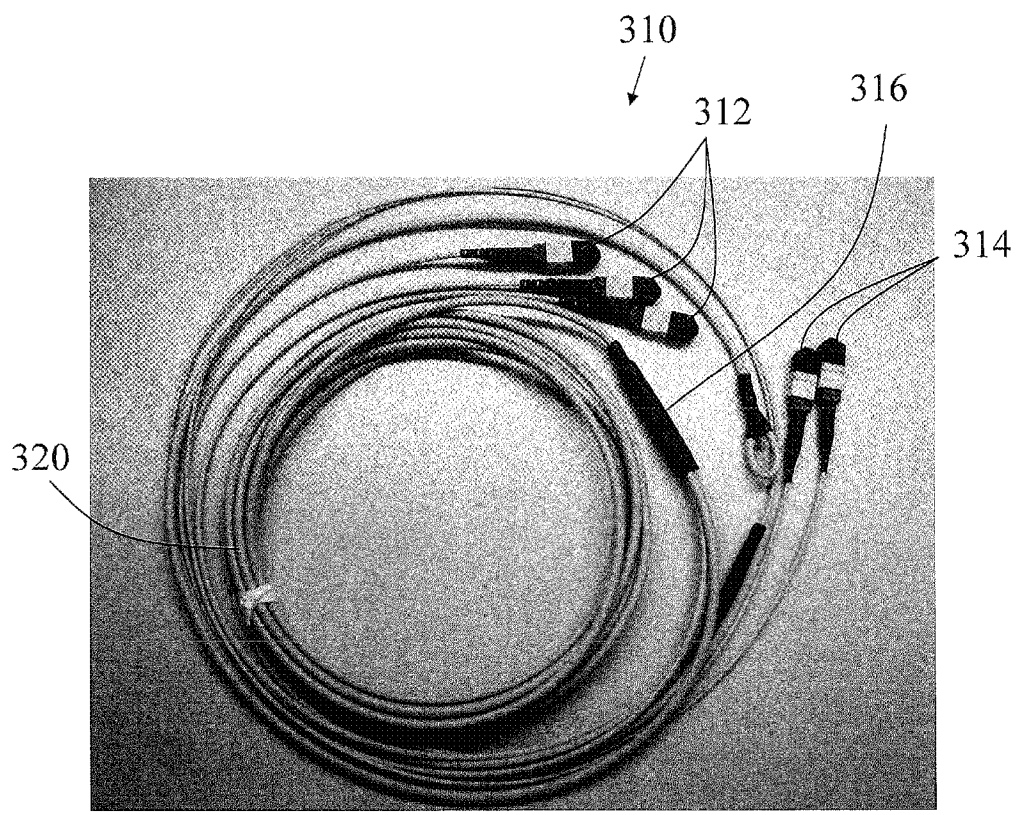
FIG. 4 is a digital image of a harness cable according to an exemplary embodiment.

Referring to FIGS. 2-4, the fiber optic harness assembly 110 may include a furcation 116, 216, 316 (e.g., partitioning element, separation structure) between the first and second sets of connectors 212/214, 312/314 through which passes each of the groups of optical fibers (see FIGS. 1-2). FIG. 3 shows the furcation 216 as part of a harness module 210, which also includes a housing 218 supporting fiber optic cables 220 and multi-fiber connectors 212, 214 arranged in a scheme similar to FIGS. 1-2 or the alternate embodiments disclosed. FIG. 4 shows the furcation 316 as part of a harness cable 310. As shown in FIGS. 3-4, there is a separate tube 320 (e.g., jacket, sheath, furcation tube, leg) between the furcation 316 and each of the connectors 312, 314, and each of the groups of optical fibers passes through two of the tubes 320 between the first and second sets of connectors 312, 314.

In FIG. 3, the connectors 212, 214 are constrained relative to one another by the housing 218, while in FIG. 4 the tubes 320 are maneuverable and are at least 0.3 m in length, whereby any two of the connectors 312, 314 may be positioned relative to one another anywhere in a distance range between adjoining one another (i.e., touching) to at least 0.5 m apart from one another (i.e., about 0.6 m) (e.g., or at least about 1 m apart from one another where the length of the tubes is at least 0.5 m in length; or greater distances with greater tube lengths), which allows for great flexibility in the routing of data communications, such as between various components of computer hardware in a data center.

Referring to FIG. 3, Applicants have found that the maximum length of the harness cables 220 within the module 210 should be approximately twelve and a half inches (or the metric equivalent length), which has been found to allow enough slack for the cables 220 to be inside the module space (i.e., within the housing 218) without going under the connectors 212, 214. The minimum length of the harness cables 220 should be approximately nine and a half inches, which will allow for two reworks of the connectors 212, 214 at 38 mm length, as necessary, and still allows enough slack in the module 210 for low tension on the fibers in the cables 220.

Referring to FIG. 5, two harness assemblies (see also FIGS. 1-2), modules and/or cables as disclosed herein, may be used together as part of a polarity scheme and convey data via parallel optics transmission. The harnesses assemblies may be joined by trunk cables $T_1$, $T_2$, and may be configured according to a standard key-up/key-down configuration, as described in TIA 568C.0 standards (e.g., type A, type B, types A and/or B, type C) with regard to flipping polarity. The trunk cables $T_1$, $T_2$ may include any number of trunks or extender trunks, and may be routed through intermediate elements according to a more-elaborate scheme. As illustrated by the arrows shown in FIG. 5, for example, the trunk cables $T_1$, $T_2$ may support optical signals passing in both directions (e.g., both receiving and transmitting groups). This "two-way traffic" in each connector provides robustness to the system, where if one of the two trunk cables $T_1$, $T_2$ should fail, the other will still be able to pass signals for data communication, albeit at a slower speed.

Parallel optics for four-parallel-lane transmission (Tx) for land receivers (Rx) from 40 G (4×10 G) or 100 G (4×25 G) utilizing a twelve-fiber base multi-fiber connector MTP structure, as specified in IEEE (4×10), utilizes only 8-fibers out of the twelve-fiber MTP. However, embodiments disclosed herein enable customers to utilize all 12-fiber in backbone trunks, when six groups include four fibers each (see FIGS. 1-2). Additionally, the disclosed polarity schemes for QSFP devices (see FIG. 5) keep a logical flow of MTPs on one side to go to the nearest other MTP; the middle MTP is the only one that is split. In furcation during manufacturing, the process may be kept simple by utilizing two subunits and keeping most of the fibers grouped in the same tube. Only fibers from the middle MTP (e.g., pair $P_2$ as shown in FIGS. 1-2) are diverted in groups. While other schemes may mix fibers from several groups, which increases risks of improper polarity. Furthermore, embodiments disclosed herein reduce skew because parallel signals are kept along same path with same length.

When converting to parallel optic systems, customers may face difficulty managing the placement of alignment pins in a fiber optic link, which are typically required for MTP/MPO connector mating, where one connector is pinned and the other pin-less. In addition, SR4 transmission requires 8-fibers for communication, however most current MPO cabling systems are 12-fiber or 24-fiber based, which results in less than 100% fiber utilization.

According to another aspect of technology disclosed herein, a user is able to use a single jumper to install at any location in a link and with any orientation regardless of system architectures by using a pin-less jumper (i.e., no pins on associated connectors) to plug into both the electronics and patch field. Some such embodiments include a pinned-to-pinned conversion module that allows a single pin-less jumper to be utilized in all system architectures while achieving 100% fiber utilization. According to an exemplary embodiment, the conversion could be any variation of the following configurations in addition to their multiples: (1) 24-fiber MPO to (3) 8-fiber MPO; (2) 12-fiber MPO to (3) 8-fiber MPO; (1) 24-fiber MPO to (2) 12-fiber MPO; (1) 48-fiber MTP to (6) 8-fiber MPO or (2) 24-fiber. In some embodiments, MTP jumpers are converted or replaced from a pinned-unpinned structure jumper, to a completely pin-less jumper structure. In addition, this same pin-less jumper may work in a direct-connect (from electronic port to electronic port) and in a cross-connect cabling scheme. By contrast, with contemporary systems such cabling schemes would require various wiring/pinning jumper schemes, but the present solution simplifies the options for a single jumper solution to "fit all." Combining such a structure with a pinned MTP connector inside a module (see, e.g., FIG. 3) allows all trunks and jumpers in the link to be of the same polarity and pinning Referring to FIG. 3, a conversion device could be in a Plug & Play™ closet connector housing (CCH) module footprint or a Pretium EDGE® module footprint, as manufactured by Corning Cable Systems LLP of Hickory, N.C., United States of America. Some embodiments include pinned MTP connectors inside the module with unpinned trunks/jumpers external to the module.

The construction and arrangements of the fiber optic harness assembly and polarity schemes, as shown in the various exemplary embodiments, are illustrative only. Although only a few embodiments have been described in detail in this disclosure, many modifications are possible (e.g., variations in sizes, dimensions, structures, shapes, and proportions of the various elements, values of parameters, mounting arrangements, use of materials, colors, orientations) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A fiber optic harness assembly, comprising:
   first, second, third, fourth, fifth, and sixth groups of optical fibers, wherein the groups of optical fibers are arranged in data transmission pairs of the groups whereby one group of each pair is configured to transmit data and the other group of the pair is configured to receive data, wherein the pairs of the groups are organized such that a first pair comprises the first and second groups of optical fibers, a second pair comprises the third and fourth groups of optical fibers, and a third pair comprises the fifth and sixth groups of optical fibers;
   a first connector set comprising first, second, and third connectors; and
   a second connector set comprising fourth and fifth connectors, wherein the first pair of groups of optical fibers extends between the first and fourth connectors such that the optical fibers of the first and second groups of optical fibers are all the same length as one another, wherein the third pair of groups of optical fibers extends between the third and fifth connectors such that the optical fibers of the fifth and sixth groups of optical fibers are all the same length as one another, and wherein the third group of optical fibers extends between the second and fourth connectors and the fourth group of optical fibers extends between the second and fifth connectors, wherein the optical fibers of the third group of optical fibers are all the same length as one another and the optical fibers of the fourth group of optical fibers are all the same length as one another.

2. The fiber optic harness assembly of claim 1, wherein the optical fibers of the third and fourth groups of optical fibers are a different length than the optical fibers of the groups of optical fibers of the first and third pairs.

3. The fiber optic harness assembly of claim 2, wherein the optical fibers of the groups of optical fibers of the first and third pairs are all the same length as one another, and wherein the optical fibers of the third and fourth groups of optical fibers are all the same length as one another.

4. The fiber optic harness assembly of claim 1, wherein the first, second, third, fourth, fifth, and sixth groups of optical fibers each include at least four optical fibers.

5. The fiber optic harness assembly of claim 1, wherein the first, second, third, fourth, fifth, and sixth groups of optical fibers each include the same number of optical fibers as one another.

6. The fiber optic harness assembly of claim 1, wherein the groups of optical fibers only cross one another at two locations between the first and second sets of connectors.

7. The fiber optic harness assembly of claim 6, wherein the corresponding crossings consist of a first crossing between the second and third groups and a second crossing between the fourth and fifth groups.

8. The fiber optic harness assembly of claim 1, further comprising at least one furcation between the first and second sets of connectors through which passes each of the groups of optical fibers.

9. The fiber optic harness assembly of claim 8, further comprising a separate tube between the at least one furcation and each of the connectors, and wherein each of the groups of optical fibers passes through two of the tubes.

10. The fiber optic harness assembly of claim 9, wherein the tubes are maneuverable and are at least 0.3 m in length, whereby any two of the connectors may be positioned relative to one another anywhere in a distance range between adjoining one another to at least 0.5 m apart from one another.

11. The fiber optic harness assembly of claim 1, wherein the first pair of groups of optical fibers only extends between the first and fourth connectors, and wherein the third pair of optical fibers only extends between the third and fifth connectors.

12. The fiber optic harness assembly of claim 1, wherein each of the connectors of the second set receives at least one group of two different pairs but not a group from three different pairs of the groups of optical fibers.

13. A fiber optic harness assembly, comprising:
first, second, third, fourth, fifth, and sixth groups of optical fibers, wherein the groups of optical fibers are arranged in data transmission pairs of the groups whereby one group of each pair is configured to transmit data and the other group of the pair is configured to receive data, wherein the pairs of the groups are organized such that a first pair comprises the first and second groups of optical fibers, a second pair comprises the third and fourth groups of optical fibers, and a third pair comprises the fifth and sixth groups of optical fibers;
a first connector set comprising first, second, and third connectors; and a second connector set comprising fourth and fifth connectors, wherein the first pair of groups of optical fibers only extends between the first and fourth connectors, wherein the third pair of groups of optical fibers only extends between the third and fifth connectors, wherein the third group of optical fibers only extends between the second and fourth connectors and the fourth group of optical fibers only extends between the second and fifth connectors, and wherein the groups of optical fibers only cross one another at two locations between the first and second sets of connectors.

14. The fiber optic harness assembly of claim 13, wherein the optical fibers of the first group are all the same length as one another.

15. The fiber optic harness assembly of claim 14, wherein the optical fibers of the second group are all the same length as one another, and wherein the optical fibers of the first and second groups of optical fibers are the same length as one another.

16. A fiber optic harness assembly, comprising:
first, second, third, fourth, fifth, and sixth groups of optical fibers, wherein the groups of optical fibers are arranged in data transmission pairs of the groups whereby one group of each pair is configured to transmit data and the other group of the pair is configured to receive data, wherein the pairs of the groups are organized such that a first pair comprises the first and second groups of optical fibers, a second pair comprises the third and fourth groups of optical fibers, and a third pair comprises the fifth and sixth groups of optical fibers,
a first connector set comprising first, second, and third connectors;
a second connector set comprising fourth and fifth connectors, wherein the first pair of groups of optical fibers extends between the first and fourth connectors, wherein the third pair of groups of optical fibers extends between the third and fifth connectors, and wherein the third group of optical fibers extends between the second and fourth connectors and the fourth group of optical fibers extends between the second and fifth connectors;
at least one furcation between the first and second sets of connectors through which passes each of the groups of optical fibers; and
tubes comprising a separate tube between the at least one furcation and each of the connectors, wherein each pair of groups of optical fibers passes through two of the tubes, and wherein the tubes are maneuverable and at least 0.3 m in length, whereby any two of the connectors may be positioned relative to one another anywhere in a distance range between adjoining one another to at least 0.5 m apart from one another.

17. The fiber optic harness assembly of claim 16, wherein the optical fibers of the first group are all the same length as one another.

18. The fiber optic harness assembly of claim 17, wherein the optical fibers of the second group are all the same length as one another, and wherein the optical fiber of the first and second groups of optical fibers are the same length as one another.

19. The fiber optic harness assembly of claim 18, wherein the first, second, third, fourth, fifth, and sixth groups of optical fibers each include at least four optical fibers.

20. The fiber optic harness assembly of claim 19, wherein the first, second, third, fourth, fifth, and sixth groups of optical fibers each include the same number of optical fibers as one another.

* * * * *